Dec. 29, 1970   C. A. LINDQUIST, JR   3,551,197
DIELECTRIC FILMS
Filed Jan. 15, 1968

INVENTOR
Claude A. Lindquist, Jr.
BY Francis X. Murphy
Charles J. Knuth
AGENTS

United States Patent Office 3,551,197
Patented Dec. 29, 1970

3,551,197
DIELECTRIC FILMS
Claude A. Lindquist, Jr., Easton, Pa., assignor to Pfizer Inc., New York, N.Y., a corporation of Delaware
Filed Jan. 15, 1968, Ser. No. 697,934
Int. Cl. H01g 3/07, 3/09
U.S. Cl. 117—217                                7 Claims

ABSTRACT OF THE DISCLOSURE

Dielectric films of high capacitance and high dielectric strength consisting of organic film base coated with a dispersion of finely divided ceramic in a water-insoluble organic resin matrix.

BACKGROUND OF THE INVENTION

The present invention relates to high energy storage capacitors and more particularly to composite dielectric elements characterized by high capacitance and high dielectric strength.

Capacitors which afford high capacitance per unit volume have been keenly sought for numerous applications where bulk and weight must be minimized for reasons of portability or space. Ceramic capacitors have been used in the past where high capacitance is needed, but their relatively low dielectric strength precludes their use in high energy storage applications at high voltages. In addition, their physical characteristics are not suited to the preparation of rolled condensers of low weight and bulk. On the other hand, some synthetic resin films exhibit the high dielectric strength needed in high voltage applications, but are characterized by dielectric constants too low to provide the capacitance required in very high energy storage applications.

SUMMARY OF THE INVENTION

Composite dielectric elements of high dielectric constant and high dielectric strength have now been prepared by coating an organic film base with a dispersion of particulate ceramic in a water-insoluble organic resin matrix. Combined with conductive electrodes, the new dielectric films provide unusually high energy storage capacity, substantially above 30 Joules per pound or 2.5 Joules per cubic inch. The coated films are found to be strong and flexible, capable of being rolled, and with tensile strengths of 25,000 p.s.i. or more. The coatings are tightly adherent and resist flaking and chipping even when subjected to severe abrasion, torsion and flexure.

These excellent properties are provided, in accordance with the invention, by an organic film base such as polyethylene terephthalate up to 0.01 inch in thickness, having on one or both surfaces a substantially uniform coating comprising a water-insoluble organic resin matrix up to 0.01 inch in thickness containing particulate ceramic of under 10 micron particle size uniformly dispersed therein.

Figure 1:
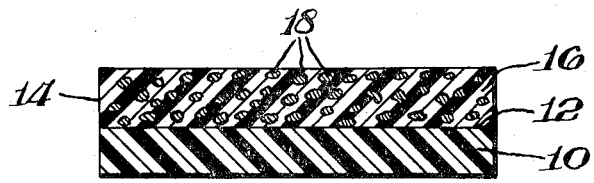
Figure 2:
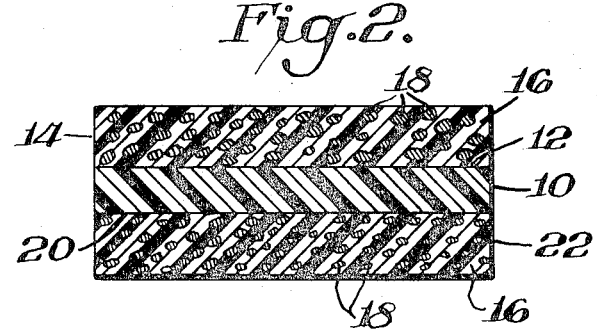

The invention will be more clearly understood by reference to the following detailed description, taken in conjunction with the accompanying drawings, in which FIG. 1 is an enlarged view in cross section of a dielectric element constructed in accordance with one embodiment of the invention, and FIG. 2 is an enlarged view in cross section of a dielectric element constructed in accordance with a second embodiment of the invention.

DETAILED DESCRIPTION OF THE INVENTION

FIG. 1 shows an organic film base 10 having on its upper surface 12 a substantially uniform coating 14 of water-insoluble organic resin matrix 16 with ceramic particles 18 uniformly dispersed therein.

In FIG. 2 is seen an organic base 10 coated on both its upper and lower surfaces 12 and 20 with substantially uniform coatings 14 and 22 of organic resin matrix 16 containing ceramic particles 18.

Any particulate ceramic of under 10 micron particle size is appropriate, especially stable inorganic compounds of high dielectric constant. In particular, titanate, tantalate and niobate compounds are found most suitable. Strontium titanate, calcium titanate, cadmium niobate and lead titanate are appropriate compounds, and barium titanate is especially preferred.

Barium titanate is a product of commerce, and can be obtained in various grades which are characterized by dielectric constants ranging from about 1250 to 3000, as measured in sintered form. It can also be chemically prepared by wet milling titanium dioxide with barium carbonate for several hours, followed by drying and heating at about 1280–1285° C. for about one hour. After cooling, the product is pulverized, e.g. to a particle size range of about 0.5–3 microns, suitably by hammer-milling.

The dielectric constant of barium titanate, as is well known, reaches a peak at about 120° C., the so-called "Curie point", beyond which the crystal changes from tetragonal to cubic. Instead of 100% barium titanate, combinations of titanates or varying Curie peak can be employed, e.g. barium-lead titanate or barium-strontium titanate, to achieve dielectric constants of more linear temperature coefficient.

Best results are achieved when the ceramic powder constitutes from about 40 to 90 weight percent of the coating composition. Ceramic concentrations below 40% may be employed, but they do not utilize to the fullest extent the excellent dielectric property of the ceramic. It is also possible to employ ceramic loadings above 90%, but the added increase in dielectric constant is minor, and the resulting coating may suffer in flexiblility and abrasion resistance. Particularly good results have been obtained with coatings containing about 70–75 weight percent ceramic.

The organic resin matrix in which ceramic is dispersed functions as an adhesive to bind the ceramic to the film base. In view of the adverse effect of water on electrical properties, the matrix must be a hydrophobic or water-insoluble resin. A great variety of organic resins lend themselves to this requirement, including the fluorocarbon resins such as polytetrafluoroethylene and polychlorotrifluoroethylene; cellulosics such as cellulose acetate butyrate, cellulose nitrate, cellulose propionate, regenerated cellulose and methyl and ethyl cellulose; alkyd resins such as those produced by condensation of phthalic anhydride with fatty acid glycerides; epoxy resins; polyamides such as the condensation product of adipic acid with hexamethylene diamine; polyethylene and polypropylene; polystyrene; polyurethanes; polyvinyl chloride and vinyl chloride-vinyl acetate copolymers; polyvinylidene chloride; silicone resins; polysulfone resins; polyphenylene oxide resins; and polyimide resins. The resin will preferably exhibit a 24-hour water absorption below about 2%. It can be chosen for specific properties, e.g. unusually high temperature stability, power factor, insulation resistance or the like, to satisfy a particular application. Especially preferred for most purposes are the polyester and polycarbonate resins.

Excellent results are achieved employing saturated polyester resins, which are linear condensation products of aromatic and/or aliphatic dicarboxylic acids with dihydric alcohol such as a polymethylene glycol, e.g. ethylene glycol. These may be prepared by esterification of the respective acids and alcohol, or by transesterification of the appropriate bis-(hydroxyalkyl) esters of the dicarboxylic acids, suitably by heating at about 200–300° C. under reduced pressure. Typical resins of this type, described in U.S. Pat. 2,892,747, are the polyesters of a polymethylene glycol of 2 to 6 carbon atoms with a combination of dicarboxylic acids consisting of 20–60 mol percent terephthalic acid, 15–50 mol percent isophthalic acid and 10–50 mol percent of at least two saturated acyclic dicarboxylic acids, such as adipic and sebacic acids. The acyclic acids preferably contain 4 to 10 carbon or carbon and oxygen atoms in a linear chain between the carboxylic groups, and are employed in a mutual molar ratio of 0.5–2.0. Such polyesters, having inherent viscosity of 0.4 to 1.0, may be employed in a reaction-inert solvent, such as dioxane, tetrahydrofuran, methylene chloride, chloroform, 1:1 toluene:dioxane or 1:3 dioxane-methyl ethyl ketone, or they may be blended with high-boiling solvents or plasticizers and applied by hot-melt techniques.

Other appropriate polyesters, described in U.S. Pat. 2,623,033, are the condensation products having an inherent viscosity of 0.6 or more, prepared by esterifying polymethylene glycols of 2 to 6 carbon atoms with a combination of decarboxylic acids consisting of 30 to 60 weight percent aromatic dibasic acid, such as terephthalic acid, and 70 to 40 weight percent saturated acyclic dicarboxylic acid of 6 to 11 carbon or carbon and oxygen atoms in a linear chain between the carboxyl groups, e.g. sebacic acid.

When such saturated polyesters are employed as resin matrix, it is sometimes beneficial, although not essential, to incorporate a polyfunctional isocyanate in minor proportion in the composition, to achieve further condensation or cross-linking of the polyester in the coating composition. Typical of such polyisocyanates are those described in U.S. 2,683,730, i.e. mixtures of compounds of the general formula

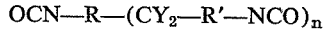

in which R and R' are arylene, e.g. phenylene; Y is hydrogen, alkyl or aryl, preferably hydrogen; and $n$ is a whole number. For clarity, this formula may be rewritten as

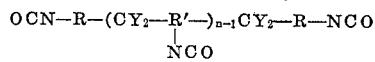

showing that the recurring units are joined to the chain through the arylene radicals. Such mixtures, preferably containing 60% or more of polyisocyanate having more than two isocyanate groups per mole, are prepared by reaction of an aryl mono primary amine with an aliphatic or aromatic aldehyde or ketone, followed by rearrangement of the resulting secondary polyamines with mineral acid, and phosgenation of the rearranged primary polyamines.

Another class of agents, suitable for use in further condensing the polyesters, are those polyisocyanates described in U.S. Pat. 2,855,421, i.e. the reaction products of trihydric and dihydric alcohols with organic diisocyanate in the proportions of 1 to 1.7 isocyanate groups per hydroxyl group. Suitable trihydric alcohols include triethanolamine and lower aliphatic trihydric alcohols such as trimethylolpropane; appropriate dihydric alcohols include diethylene glycol and lower aliphatic glycols such as 1,3-butylene glycol; the organic diisocyanate may be alkyl or cycloalkyl, e.g. hexamethylene diisocyanate, or aryl or arkaryl, e.g. tolylene diisocyanate. The resulting polyisocyanates may be employed in a reaction-inert solvent, e.g. ethyl acetate. They may be converted into blocked isocyanates by reaction with phenol or malonic ester to bind the free isocyanate groups, forming addition products capable of being decomposed by heat, thereby releasing polyisocyanate for reaction at elevated temperature.

The optimum levels of such isocyanate curing agents are readily calculated from the hydroxyl content of the polyester, and levels of 5–20 wt. percent based on the polyester are typical.

Another class of resins suitable for the matrices of the new composite dielectric elements are the polycarbonate resins, such as the carbonic acid esters of bis-(4-hydroxyphenyl)2,2-propane (bisphenol A), prepared by the reaction of phosgene with bisphenol A. Suitable solvents for use with these resins are dioxane and the chlorinated hydrocarbons such as methylene chloride, ethylene dichloride, chloroform, tetrachloroethane and 1,1,2-trichloroethane. Polycarbonate resins are available commercially from the General Electric Company and the Mobay Chemical Company.

Other suitable resin matrices are those which are addition polymers of unsaturated polyesters, e.g. the condensation products of dihydric alcohols, such as 1,2-propylene glycol, with unsaturated dicarboxylic acids, e.g. maleic anhydride, fumaric acid or itaconic acid, modified if desired by substitution of part of the unsaturated acid with an equivalent proportion of saturated dibasic acid such as adipic acid, phthalic anhydride or sebacic acid, for example. If such unsaturated polyester is employed as binder, it will be desirable to include a catalytic proportion of polymerization initiator such as an organic peroxide, e.g. benzoyl peroxide, methyl ethyl ketone peroxide or diter.-butyl peroxide; or an azo compound such as α, α'-azodiisobutyronitrile, to cause addition polymerization or cross-linking of the polyester to occur. If desired, the unsaturated polyester may be copolymerized with a minor proportion of another monomer such as styrene.

It is desirable, but by no means essential, to include a wetting or dispersing agent in the coating composition, to insure uniform dispersion of the ceramic throughout the organic resin matrix, and therefore to insure that the optimum dielectric properties are achieved. A great variety of dispersing agents can be used to advantage. Among the non-ionic surface active agents are the polyethers which result from condensation of ethylene oxide with octylphenol, nonylphenol, or lauryl, octyl, stearyl or oleyl alcohols. Other such agents include polyoxyethylene sorbitol hexaoleate, and the fatty acid esters of polyethylene glycols. Likewise, anionic agents may be employed, such as the alkylaryl ether sulfates, sodium isopropyl naphthalene sulfoate, and the dialkyl sulfosuccinates, as well as cationic agents such as N-hexadecyl and N-octadecenyl trimethylene diamine dioleates. Particularly good results have been achieved with sodium dioctyl sulfosuccinate, advantageously employed in combination with lecithin. Typical dispersing agent levels will range from about 0.5 to about 5 wt. percent, and usually about 2–3% gives excellent results. Optimum levels will vary with the formulation, particularly with the particulate ceramic concentration and the viscosity, and are therefore best determined by experiment. If no dispersing agent is employed, extra attention should be paid to careful and thorough blending of the coating composition before use.

It will often be desirable to dilute the organic resin matrix composition with a volatile solvent to facilitate application to the organic film base. The choice of solvent will depend upon the solubility characteristics of the particular resin selected to form the matrix, as well as on the viscosity characteristics most suitable to the particular coating method chosen. Any reaction-inert solvent capable of subsequent removal by evaporation can be employed. A number of suitable solvents have already been mentioned above, and others will readily occur to those skilled in the art. By "reaction-inert" is meant a solvent which is free of adverse effect on the resin matrix components and the film base under the coating conditions. Both dioxane and methylene chloride have been found eminently suitable for the purpose. In addition, in some cases it may be desirable to include a more permanent diluent in the form of a minor proportion of plasticizer for the resin which forms the matrix. Thus, for example, in the case of a polyvinyl chloride matrix, any one of the high-boiling esters which are recognized polyvinyl chloride plasticizers can be used, i.e. dioctyl phthalate, tricresyl phosphate, trioctyl phosphate, and dibutyl sebacate. Typical plasticizer proportions will range from about 5 to 50% based on the weight of the resin which forms the matrix.

The organic film base to which the resin matrix is applied may range up to 0.01 inch in thickness. Any dielectric film may be employed, including films of polyurethane, fluorocarbon, cellulosics such as methyl and ethyl cellulose, silicone resins, polysulfone resins, polyethylene and the like. Those resins previously listed as appropriate to form the matrix may also be employed as the organic film base. Polycarbonate resins are advantageous for this use, because they can be employed in elevated temperature service, at temperatures up to 125°. Preferred organic film bases are the polyester resins, particularly those which are linear condensation products of saturated organic dibasic acids and glycols, e.g. polyethylene terephthalate, described in U.S. Patent 2,465,319, which affords unusually high physical and dielectric strength. This resin can be readily obtained in thickness as low as 0.25 mil (0.00025 inch, 25 gauge) as well as in thicknesses up to 3 mils and higher.

The organic resin matrix is applied in the form of a substantially uniform coating on at least one surface of the organic film base, and it will often be desirable to apply such coating on both surfaces of the film base. By "substantially uniform coating" is meant a coating which is of substantially uniform thickness, and which is smooth and characterized by good surface integrity, i.e. freedom from gross pinholes. Each coating of organic resin matrix may be up to 0.01 inch in thickness. It can be suitably applied to the film base by use of a knife-coating technique, for example with a precision knife-over-roll coater. The resin matrix dispersion containing the particulate ceramic and other ingredients is first thoroughly homogenized, and this is appropriately accomplished by milling in a ceramic ball mill to avoid contamination by electrically conductive impurities. Immediately before coating, it is best to filter the dispersion, as through a filter of about 5 micron pore size. The coating is applied to one surface of the film base, and it can then be dried either at ambient or elevated temperature. After the first coating is dry, the second surface of the film base can be coated in like manner if desired.

When the coating is applied to one surface at a time, as by knife-coating, it is best to limit each dried coating thickness to a maximum of about 2–2.5 times the thickness of the organic film base, since such will minimize any problems of curling as the coating dries. If even thicker coatings are desired, any curling problem can be avoided by coating both sides of the film base simultaneously. This is conveniently accomplished by a single pass of the film base through a tank of the dispersion, in which case the thickness can be controlled by varying the viscosity of the coating dispersion as well as the rate at which the film base is drawn through the dispersion. Relatively thin coatings, e.g. 0.25 mil or less, can be employed, but coatings of higher thickness provide a higher volume fraction of coating in the final composite dielectric element, and hence higher dielectric constant. Excellent results have been obtained, in the case of 0.5 mil film base, with coatings about 0.5–1 mil in thickness.

The dry, coated film base can be further treated to reduce any surface imperfections and to increase coating density by calendering with heat and pressure. Such final calendering step affords excellent control over the total thickness of the composite dielectric element.

The capacitor is formed by combining the coated dielectric element with conductive elements or electrodes, preferably in sheet or strip form. As is well known in the art, this can be accomplished by mounting or rolling the dielectric film between a pair of metal foil strips, or alternatively by depositing a metallic coating on both surfaces of the dielectric film, e.g. aluminizing by vapor deposition.

The following examples are illustrative in nature and are not intended to limit the invention, the scope of which is defined by the appended claims.

EXAMPLE 1

|  | Grams |
|---|---|
| Barium titanate [a] | 844 |
| Polyester resin [b] | 1530 |
| Isocyanate curing agent [c] | 22.5 |
| Sodium dioctyl sulfosuccinate [d] | 9 |
| Soybean lecithin [e] | 24 |

[a] 0.5 micron particle size.
[b] (A 20% solids solution of saturated polyester condensation product, available from Du Pont as No. 46950 Adhesive, and described in U.S. Patent 2,892,747.
[c] A 60% solids solution of polyfunctional isocyanate, available from Du Pont as RC–829 and described in U.S. Patent 2,683,730.
[d] Aerosol OT–100%, available from Cyanamid.
[e] Available from Ross & Rowe as Yelkin TTS.

The above coating formulation, which represents 70.5 weight percent barium titanate on a solids basis, is prepared in the following manner: The ingredients, minus the curing agent, are milled together for 26 hours in a ceramic ball mill with high density, high alumina ¾ inch diameter balls equal to half the volume of the empty mill. The curing agent is then added and milling continued for 30 minutes more.

The resulting uniform dispersion is hand doctored on one side of a 1.42 mil polyethylene terephthalate film (available from Du Pont as Mylar polyester) to form a uniform coating 0.375 mil thick. After three hours' drying at room temperature, the process is repeated on the other side of the film, and the product is cured by storing at room temperature for 1–2 weeks. Finally, the coated film is given one pass through a calendering machine at 180° F. surface temperature on the polished steel roll.

The dielectric constant of the product film is found to be 5.0, and the dielectric strength 4000 volts per mil. The dielectric constant of the coating is calculated to be 28.5 by Lichenecter's logarithmic mixing rule.

EXAMPLE 2

The method of Example 1 is repeated, this time applying 0.54 mil coatings on both sides of 0.62 mil polyethylene terephthalate. The dielectric constant is found to be 7.5, and the dielectric strength 5880 volts per mil.

EXAMPLE 3

|  | Grams |
|---|---|
| Barium titanate [f] | 1065 |
| Polyester resin [b] | 1530 |
| Isocyanate curing agent [g] | 22.5 |
| Sodium dioctyl sulfosuccinate [d] | 9.0 |
| Soybean lecithin [e] | 24.0 |
| 1,4-dioxane | 100 |

[f] 0.5–3.0 micron particle size, chemically prepared titanate available from Titanium Alloy Division of National Lead Co.
[g] A 60% solids solution of blocked polyfunctional isocyanate as described in U.S. Patent 2,855,421, available from Du Pont as RC–805.
Other references refer to key in Example 1.

This coating formulation, representing 75.2 wt. percent barium titanate on a solids basis, illustrates the use of added solvent. It is prepared by milling the ingredients, less the dioxane solvent and curing agent, in a ceramic ball mill as described in Example 1. The curing agent and solvent are then added and milling continued for 30 minutes more.

The resulting uniform dispersion is fed from the ball mill to a laboratory knife-over-roll coating machine with 0.5 mil polyethylene terephthalate film (Mylar polyester). The knife is adjusted to give a 2.5 mil spacing over the film, at a coating speed of 50 lineal feet per minute. The coated film passes through an oven at 165° F. and, after drying three hours at room temperature, the opposite side is coated in the same fashion. After curing for one week at room temperature, the two coatings are each 0.55 mil thick. The coated film is lightly calendered in one pass at 180° F. surface temperature on the polished steel roll to eliminate any surface imperfections.

The dielectric constant of the coated film is found to be 8.0, with a dissipation factor of 1.14% as measured with evaporated gold electrodes 8 mm. in diameter. This is in excellent agreement with the dielectric constant estimated from the characteristics of the polyester and barium titanate, indicating a highly uniform dispersion with absence of imperfections. The dielectric strength is 5300 volts per mil. The dielectric constant of the polyphase coating is calculated to be 34.9.

The experiment is repeated, omitting the curing agent, and the resulting coated film has a dielectric constant of 8.3, a dissipation factor of 1.6%, and a dielectric strength of about 5500 volts per mil.

EXAMPLE 4

The experiment of Example 3 is repeated, applying 0.55 mil coatings to both sides of 0.5 mil polyethylene terephthalate film, which yields a composite dielectric film having a dielectric constant of 9.6, a dielectric strength of 5,700 volts per mil and a dissipation factor of 1.2%.

Another film, prepared using commercial capacitor grade barium titanate instead of the chemically prepared product, with 0.488 mil coatings on each side of 0.425 mil polyethylene terephthalate, exhibits a dielectric constant of 8, a dielectric strength of 5,700 volts per mil, and a dissipation factor of 2%.

EXAMPLE 5

|  | Grams |
|---|---|
| Strontium titanate | 1065 |
| Polycarbonate resin [h] | 319.5 |
| Sodium dioctyl sulfosuccinate [d] | 9.0 |
| Soybean lecithin [e] | 24.0 |
| Methylene chloride | 1324 |

[h] General Electric Lexan Resin 105.
Other references refer to key in previous examples.

This coating formulation is milled and applied to 0.5 mil polyethylene terephthalate film as a 0.55 mil coating on both sides as before, to prepare a composite dielectric film.

EXAMPLE 6

|  | Grams |
|---|---|
| Cadmium niobate $Cd_2Nb_2O_7$ | 810 |
| Polyester resin [1] | 328.5 |
| Epoxy resin [j] | 33.9 |
| Sodium dioctyl sulfosuccinate [d] | 9.0 |
| Soybean lecithin [e] | 24.0 |
| Toluol | 205 |
| Methyl ethyl ketone | 330 |

[1] Linear saturated polyester resin having intrinsic viscosity of 0.59±0.03 (molecular weight about 20,000) and hydroxyl value of 3.0, available from Goodyear Tire and Rubber Co. as Vitel PE-200.
[j] Polyether of epichlorohydrin and bisphenol A having an average molecular weight of 1000, a melting point of 64–76° C., an epoxy value of 0.20 equivalents per 100 grams and a hydroxyl value of 0.32 equivalents per 100 grams, available from Shell as Epon 1001.

Other references refer to key in previous examples.

This coating formulation is milled and applied to 0.5 mil polyethylene terephthalate as a 0.5 mil coating as before, to prepare a composite dielectric film.

What is claimed is:

1. A composite dielectric element for high energy storage capacitors comprising an organic film base up to 0.01 inch in thickness having on at least one surface thereof a substantially uniform coating, each coating comprising a water-insoluble organic resin matrix up to 0.01 inch in thickness containing particulate ceramic of under 10 micron particle size uniformly dispersed therein, said ceramic being selected from the group consisting of titanate, tantalate and niobate ceramics.

2. The dielectric element of claim 1 wherein both surfaces of said film base are provided with said coating.

3. The dielectric element of claim 1 wherein said coating contains from about 40 to 90 weight percent of said ceramic based on the total coating weight.

4. The dielectric element of claim 1 wherein said ceramic is barium titanate.

5. The dielectric element of claim 1 wherein said matrix is saturated polyester resin.

6. The dielectric element of claim 1 wherein said matrix is polycarbonate resin.

7. The dielectric element of claim 1 wherein said film base comprises polyethylene terephthalate.

References Cited

UNITED STATES PATENTS 3,287,446  11/1966  Koch _____ 117—138.8AX

WILLIAM L. JARVIS, Primary Examiner

U.S. Cl. X.R.

106—39; 117—68, 138.8; 252—62.3, 64; 317—261